(12) United States Patent
Hagari et al.

(10) Patent No.: US 7,305,967 B1
(45) Date of Patent: Dec. 11, 2007

(54) CONTROL APPARATUS FOR AN INTERNAL COMBUSTION ENGINE

(75) Inventors: Hideki Hagari, Tokyo (JP); Hideki Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/705,427

(22) Filed: Feb. 13, 2007

(30) Foreign Application Priority Data

Aug. 29, 2006 (JP) .............................. 2006-231950

(51) Int. Cl.
*F02D 9/08* (2006.01)
*B60T 7/12* (2006.01)

(52) U.S. Cl. ...................... 123/403; 123/478; 123/480; 701/103

(58) Field of Classification Search ................ 123/402, 123/403, 478, 480, 462; 701/103
See application file for complete search history.

(56) References Cited

U.S. PATENT DOCUMENTS

| | | | |
|---|---|---|---|
| 5,448,978 A | * | 9/1995 | Hasegawa et al. .......... 123/480 |
| 5,549,092 A | * | 8/1996 | Hasegawa et al. .......... 123/478 |
| 7,107,140 B2 | * | 9/2006 | Yoshino et al. ............. 701/102 |
| 2006/0075996 A1 | * | 4/2006 | Yoshino et al. ........ 123/568.14 |

FOREIGN PATENT DOCUMENTS

JP 11-229904 A 8/1999

* cited by examiner

*Primary Examiner*—John T. Kwon
(74) *Attorney, Agent, or Firm*—Sughrue Mion Pllc.

(57) ABSTRACT

In throttle control, a throttle opening is set with sufficient control accuracy in accordance with the operating state of an engine despite variations in a throttle body and various kinds of sensors. A target effective opening area is calculated from a target amount of intake air, an atmospheric pressure, an intake pipe internal pressure and an intake air temperature by using a flow rate formula for a throttle type flow meter. A target throttle opening is calculated from a correlation map. An actual effective opening area is calculated from the amount of intake air, the atmospheric pressure, the intake pipe internal pressure, and the intake air temperature by using the above-mentioned flow rate formula, and a learning throttle opening is calculated from the correlation map. The target throttle opening is corrected by a throttle opening learning value calculated from a deviation between the target throttle opening and the learning throttle opening.

7 Claims, 9 Drawing Sheets

# CONTROL APPARATUS FOR AN INTERNAL COMBUSTION ENGINE

BACKGROUND OF THE INVENTION

1. Field of the Invention

The present invention relates to a control apparatus for an internal combustion engine capable of controlling the opening of a throttle valve so as to obtain a target amount of intake air.

2. Description of the Related Art

In recent years, there has been proposed a control apparatus for an internal combustion engine that can obtain excellent driving performance by using, as a requested value of a driving force from a driver or a vehicle side, the output shaft torque of the internal combustion engine (hereinafter also referred to simply as an engine) which is a physical quantity directly acting on the control of the vehicle, and by deciding, as an output target value of the engine in the form of the output shaft torque, engine control quantities in the form of an amount of air, an amount of fuel and ignition timing.

In addition, it is generally known that a control quantity having the greatest influence on the engine output shaft torque among the engine control quantities is the amount of air, and there has also been proposed a control apparatus for an internal combustion engine that is capable of controlling the amount of air with a high degree of precision (see, for example, a first patent document: Japanese patent application laid-open No. H11-229904).

In the above-mentioned first patent document, in the control apparatus for an internal combustion engine that controls the opening of a throttle valve by driving an actuator provided in association with the throttle valve, a target throttle effective opening area is calculated by applying a target amount of intake air corresponding to a target engine torque to an orifice flow rate expression which is based on a differential pressure across the throttle valve, an air passing area, and a specific throttle opening is set so as to attain the target throttle effective opening area thus calculated.

Thus, when the throttle opening that attains the target amount of intake air is calculated by applying it to the orifice flow rate expression, the target amount of intake air can be adequately attained even in cases where an environmental condition such as an atmospheric pressure, an intake air temperature, etc., has changed, or where exhaust gas recirculation (hereinafter referred to as "EGR") for introduction of an exhaust gas into an intake pipe is carried out.

In the conventional control apparatus for an internal combustion engine, for example in case of the first patent document, in a throttle valve of which an effective opening area changes in accordance with the operating state of the engine, a flow coefficient, which greatly influences the shape and the opening area of the throttle valve, is obtained from the number of revolutions per minute of the engine and the pressure ratio of an intake pipe internal pressure (hereinafter referred to as an "intake manifold pressure") and the atmospheric pressure. As a result, it is difficult to accurately set the flow coefficient in a state in which the degree of opening and an effective opening area of the throttle valve are not decided.

Accordingly, there is the following problem. That is, the target throttle effective opening area to obtain the target amount of intake air can not be calculated accurately, so there arises a deviation between the target amount of intake air and the actual amount of intake air, and besides a lot of labor is required to obtain the flow coefficient and to set a map therefor.

In view of the above, it can be considered that the target throttle effective opening area in the form of the product of the throttle effective opening area and the flow coefficient is calculated by applying the target amount of intake air to the orifice flow rate expression which is based on the differential pressure across the throttle valve, the air passing area, and the flow coefficient, and the target throttle opening is calculated by using the relation between the effective opening area and the throttle opening which are suited to each other in advance, so that a throttle opening to obtain the target amount of intake air is thereby calculated without setting the flow coefficient. In this case, however, there is the following problem. That is, even with the same throttle opening, there will arise a variation in the actual opening area and/or the flow coefficient resulting from the manufacturing variation of individual throttle bodies, etc., so the amount of intake air changes depending upon the individual throttle bodies.

Further, there takes place a variation in the calculated effective opening area due to the variation and/or estimation error of various kinds of sensors that measure the intake manifold pressure, the atmospheric pressure, the intake air temperature, etc. As a result, there is a problem that there arises a variation in the actual amount of intake air with respect to the target amount of intake air due to the variation of the throttle body and the various kinds of sensors, various kinds of estimation errors, etc.

SUMMARY OF THE INVENTION

Accordingly, the present invention is intended to obviate the problems as referred to above, and has for its object to obtain a control apparatus for an internal combustion engine which can learn and correct the relation between an effective opening area and a throttle opening in such a manner that upon calculation of a throttle opening for obtaining a target amount of intake air, the target amount of intake air can be adequately attained with respect to variations in the throttle body and various sensors or various kinds of estimation errors.

Bearing the above object in mind, a control apparatus for an internal combustion engine according to the present invention includes: a throttle valve that is arranged in an intake passage of the internal combustion engine; a throttle opening control section that variably controls an amount of intake air supplied to the internal combustion engine by changing an effective opening area of the intake passage thereby to control a throttle opening of the throttle valve; and an operating state detection section that detects an operating state of the internal combustion engine, and includes an intake air amount detection section that detects the amount of intake air supplied to the internal combustion engine, an atmospheric pressure detection section that detects pressure at an atmospheric side of the throttle valve as an atmospheric pressure, an intake pipe internal pressure detection section that detects pressure at the internal combustion engine side of the throttle valve as an intake pipe internal pressure, and an intake air temperature detection section that detects an intake air temperature at an atmospheric side of the throttle valve. The control apparatus further includes: a target intake air amount calculation section that calculates a target amount of intake air based on the operating state of the internal combustion engine; a target effective opening area calculation section that calculates a target effective opening area of the throttle opening control section by applying the target amount of intake air, the atmospheric pressure, the intake pipe internal pressure and the intake air temperature to a flow rate formula for a throttle type flow meter; a target throttle opening calculation section that calculates a target throttle opening from the target effective opening area by using a correlation map between the effective opening area and the throttle opening, which are suited to each other in advance, of the throttle opening control section; an actual effective opening area calculation section that calculates an actual effective opening area of the throttle opening control section by applying the amount of intake air, the atmospheric pressure, the intake pipe internal pressure and the intake air temperature to the flow rate formula for a throttle type flow meter; and a learning throttle opening calculation section that calculates a learning throttle opening from the actual effective opening area by using the correlation map. The throttle opening control section includes a throttle opening learning value calculation section that calculates a throttle opening learning value based on a deviation between the target throttle opening and the learning throttle opening, and the throttle opening control section controls the throttle opening based on a learning corrected target throttle opening which is obtained by correcting the target throttle opening by the throttle opening learning value.

According to the present invention, a deviation in the relation between the effective opening area and the throttle opening is learned and corrected on the basis of a deviation between the target amount of intake air and the actual amount of intake air, so even in case where there are variations in the throttle body and the various kinds of sensors or various estimation errors, the throttle opening can be controlled so as to make the amount of intake air coincide with the target amount of intake air in an accurate manner.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1

Figure 1:
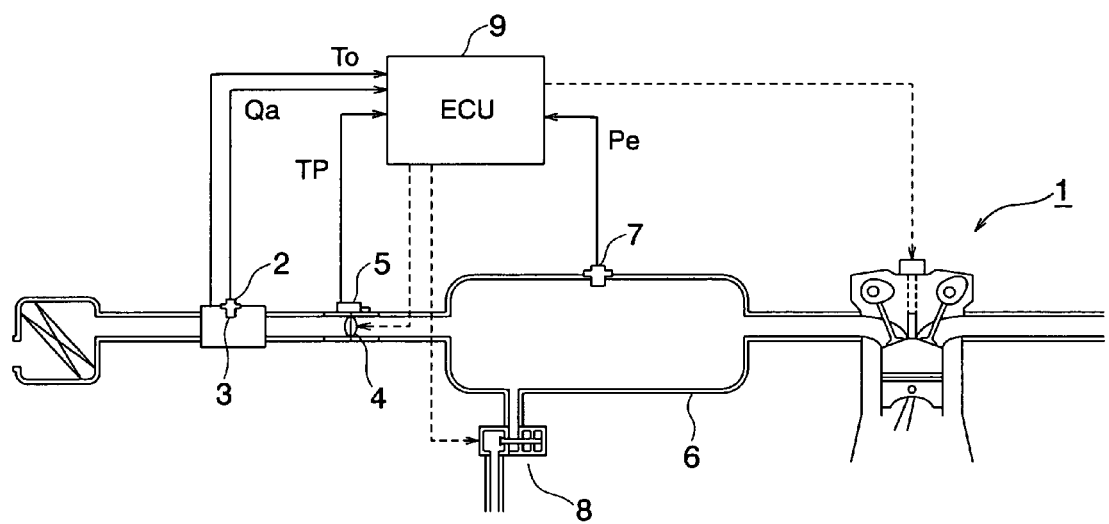
FIG. 1 is a construction view conceptually showing a control apparatus for an internal combustion engine according to a first embodiment of the present invention.
Figure 2:
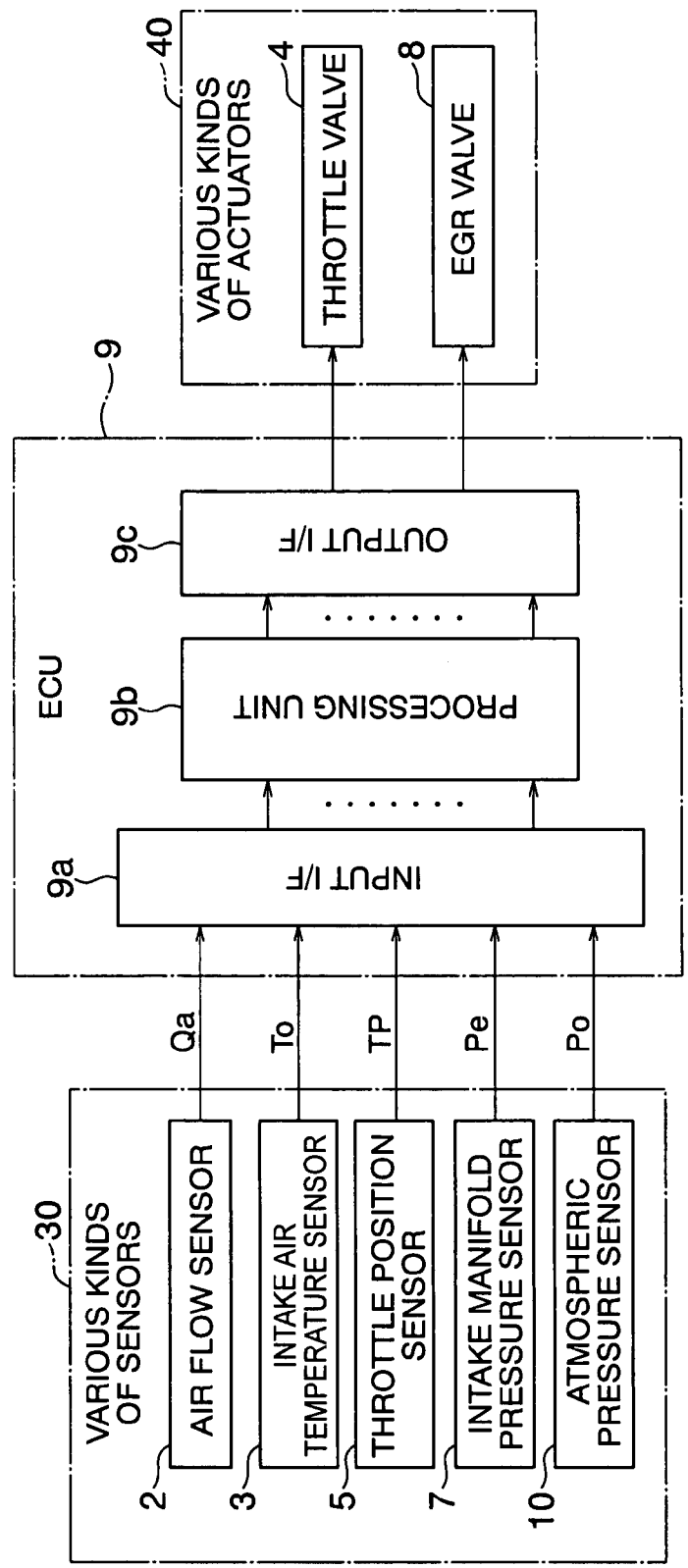
FIG. 2 is a block diagram showing the schematic configuration of the control apparatus for an internal combustion engine according to the first embodiment of the present invention.

Referring to the accompanying drawings and first to FIG. 1, therein is conceptually shown the construction of a control apparatus for an internal combustion engine according to a first embodiment of the present invention, and FIG. 2 is a block diagram that shows the schematic configuration of an engine control part of the control apparatus for an internal combustion engine according to the first embodiment of the present invention.

In FIG. 1, at an upstream side of an intake passage that constitutes an intake system of an engine 1, there are arranged an air flow sensor 2 that measures the flow rate of intake air Qa sucked to the engine 1 (hereinafter referred to as "the amount of intake air"), and an intake air temperature sensor 3 that measures the temperature of intake air To (hereinafter referred to as "the intake air temperature").

Here, note that the intake air temperature sensor 3 may be formed integrally with the air flow sensor 2, or may be formed separately from the air flow sensor 2. In addition, an element for estimating the intake air temperature To from other sensor information may be used in place of the intake air temperature sensor 3 that directly measures the intake air temperature To.

In the intake system of the engine 1, at an engine 1 side downstream of the air flow sensor 2, there is arranged a throttle valve 4 that is adapted to be controlled to open and close for adjusting the amount of intake air Qa.

A throttle position sensor 5 for measuring the opening degree TP of the throttle valve 4 (hereinafter referred to as a throttle opening TP) is attached to the throttle valve 4.

Also, at the engine 1 side downstream of the throttle valve 4, there are arranged a surge tank 6 that serves to make uniform the pressure in an intake pipe, and an intake manifold pressure sensor 7 that measures the pressure in the surge tank 6 as an intake pipe internal pressure (intake manifold pressure) Pe.

Further, connected to the surge tank 6 is an EGR valve 8 that serves to open and close an EGR tube which is placed in communication with an exhaust pipe of the engine 1.

Here, note that in place of the intake manifold pressure sensor 7 that directly measures the intake manifold pressure Pe, there any be used an element for estimating the intake manifold pressure Pe from other sensor information.

The amount of intake air Qa from the air flow sensor 2, the intake air temperature To (the temperature at an atmospheric side of the throttle valve 4) from the intake air temperature sensor 3, the throttle opening TP from the throttle position sensor 5, and the intake manifold pressure Pe from the intake manifold pressure sensor 7 are input to an electronic control unit (hereinafter referred to as an "ECU")

9 as information indicating the operating state of the engine 1 together with detection signals from other unillustrated sensors.

The ECU 9 controls the throttle opening TP of the throttle valve 4 in accordance with the result of calculation based on the operating state thereby to adjust the amount of intake air Qa, and also controls to drive a fuel injection system and an ignition system (not shown) of the engine 1 at required timing, and to open and close the EGR valve 8 thereby to improve the combustion state of the engine 1.

In FIG. 2, connected to the ECU 9 are various kinds of sensors 30 which includes, in addition to the above-mentioned group of sensors 2, 3, 5, 7, an atmospheric pressure sensor 10, etc., that detects the pressure at an atmospheric side of the throttle valve 4 as an atmospheric pressure Po.

The ECU 9 is provided with an input interface (hereinafter referred to as an "input I/F") 9a, a processing unit 9b, and an output interface (hereinafter referred to as an "output I/F") 9c.

The input I/F 9a takes in the detected information from the above-mentioned sensor group 2, 3, 5, 7, the atmospheric pressure Po measured by the atmospheric pressure sensor 10, and detection signals from the other sensors that are included in the various kinds of sensors 30, and inputs them to the processing unit 9b.

Here, note that in place of the atmospheric pressure sensor 10 that directly measures the atmospheric pressure Po, there may be used an element for estimating the atmospheric pressure Po from other sensor information.

The processing unit 9b in the ECU 9 includes a throttle opening control section which variably controls the amount of intake air Qa to be supplied to the engine 1 by controlling the throttle opening TP of the throttle valve 4 thereby change the effective opening area of the intake passage.

To this end, first of all, the processing unit 9b calculates a target torque of the engine 1 based on the input various data (engine operating state), and then calculates a target amount of intake air Qa* to achieve the target torque thus calculated.

Subsequently, the processing unit 9b calculates a target effective opening area CAt* to achieve the target amount of intake air Qa*, and also calculates a target throttle opening (hereinafter referred to as a "target opening") TP* to achieve the target effective opening area CAt*.

Further, the processing unit 9b calculates a control command value for the EGR valve 8, and also calculates control command values for other actuators (e.g., injectors of the fuel injection system arranged in combustion chambers of the engine 1, ignition coils of the ignition system, etc.) that are included in various kinds of actuators 40.

Finally, the output I/F 9c in the ECU 9 outputs driving control signals based on the calculation results of the ECU 9 to the various kinds of actuators 40 including the throttle valve 4 and the EGR valve 8.

As a result, the throttle valve 4 is controlled in such a manner that the throttle opening TP is made to coincide with the target opening TP*.

Next, reference will be made to the calculation processing, i.e., calculation of the target opening TP* to achieve the target amount of intake air Qa*, executed by the calculation processing part 9b in the ECU 9 including the throttle opening control section while referring to a functional block diagram in FIG. 3.

Figure 3:
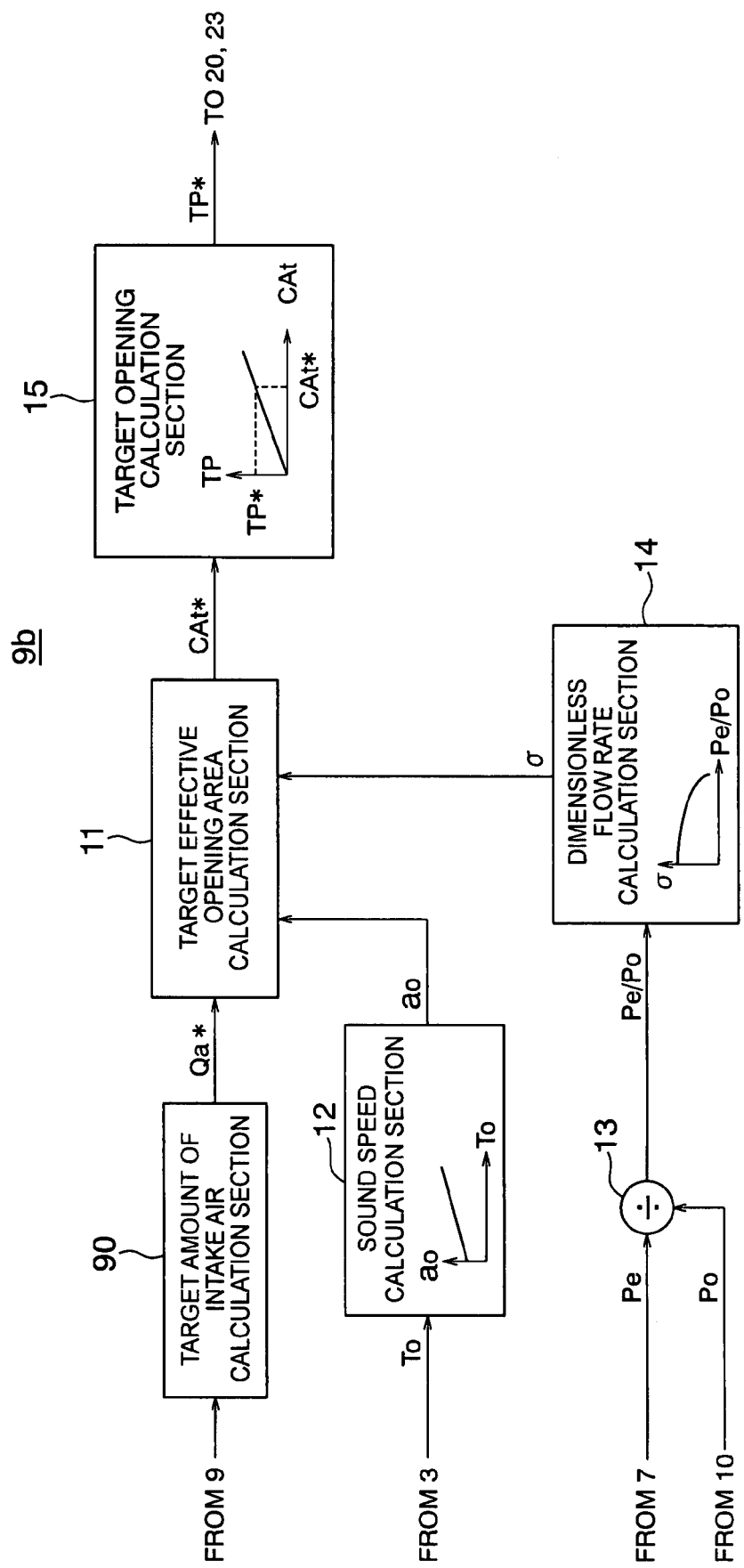
FIG. 3 is a functional block diagram showing a part of a throttle opening control section according to the first embodiment of the present invention.

In FIG. 3, the processing unit 9b in the ECU 9 is provided with a target intake air amount calculation section 90, a target effective opening area calculation section 11, a sound speed calculation section 12, a pressure ratio calculation section 13, a dimensionless flow rate calculation section 14, and a target opening calculation section 15.

The target amount of intake air calculation section 90 calculates the target amount of intake air Qa* to achieve the target torque corresponding to the operating state of the engine 1, and inputs the calculated value of the target amount of intake air Qa* to the target effective opening area calculation section 11.

The sound speed calculation section 12 calculates the speed of sound $a_0$ in the atmosphere on the basis of the intake air temperature To, and inputs it to the target effective opening area calculation section 11.

The pressure ratio calculation section 13 is in the form of a divider that calculates a pressure ratio Pe/Po of the intake manifold pressure Pe relative to the atmospheric pressure Po, and inputs the thus calculated value of the pressure ratio Pe/Po to the dimensionless flow calculation section 14.

The dimensionless flow rate calculation section 14 calculates a dimensionless flow rate σ on the basis of the pressure ratio Pe/Po, and inputs it to the target effective opening area calculation section 11.

The target effective opening area calculation section 11 calculates the target effective opening area CAt* of the throttle valve 4 based on the target amount of intake air Qa*, the speed of sound $a_0$ and the dimensionless flow rate σ as input information, and inputs it to the target opening calculation section 15.

The target opening calculation section 15 calculates the target opening TP* corresponding to the target effective opening area CAt* by using a correspondence or correlation map between the effective opening area CAt and the throttle opening TP that are suited to each other in advance (a "CAt-TP map" to be described later).

The calculated value of the target opening TP* is input to a learning basic value calculation section 20 and a learning corrected target throttle opening calculation section 23 (to be described later).

Next, reference will be made to the specific calculation processing functions of the individual calculation sections 11 through 15 in FIG. 3.

In general, a volumetric flow formula for a throttle type flow meter is represented by the following expression (1) by using the amount of intake air Qa (volumetric flow), the speed of sound $a_0$ in the atmosphere, the flow coefficient C, and the opening area At of the throttle valve 4, the intake manifold pressure Pe, the atmospheric pressure Po, and the ratio of specific heats k.

$$Qa = a_0 \cdot CA_t \cdot \sqrt{\frac{2}{\kappa - 1}\left[\left(\frac{P_e}{P_0}\right)^{\frac{2}{\kappa}} - \left(\frac{P_e}{P_0}\right)^{\frac{\kappa+1}{\kappa}}\right]} \quad (1)$$

Here, the dimensionless flow rate σ calculated by the dimensionless flow rate calculation section 14 is defined as shown by the following expression (2).

$$\sigma = \sqrt{\frac{2}{\kappa - 1}\left[\left(\frac{P_e}{P_0}\right)^{\frac{2}{\kappa}} - \left(\frac{P_e}{P_0}\right)^{\frac{\kappa+1}{\kappa}}\right]} \quad (2)$$

The amount of intake air Qa can be represented by the following expression (3) by assigning expression (2) to expression (1).

$$Qa = a_0 \cdot CA_t \cdot \sigma \tag{3}$$

Here, note that the sound speed $a_0$ in the atmosphere is represented by the following expression (4) by using a gas constant R and the intake air temperature To.

$$a_0 = \sqrt{\kappa R T_0} \tag{4}$$

In addition, upon transformation of expression (3), the effective opening area CAt represented by the product of the flow coefficient C and the opening area At of the throttle valve 4 can be calculated by the following expression (5) when the target amount of intake air Qa* required to achieve the target torque, the speed of sound $a_0$ in the atmosphere and the dimensionless flow rate σ are provided.

$$CA_t = \frac{Qa}{a_0 \cdot \sigma} \tag{5}$$

Accordingly, the target effective opening area calculation section 11 in the ECU 9 calculates the target effective opening area CAt* to achieve the target amount of intake air Qa* by using expression (5) based on the target amount of intake air Qa*, the speed of sound $a_0$ in the atmosphere and the dimensionless flow rate σ.

Thus, by calculating the target effective opening area CAt* based on the volumetric flow formula of the throttle type flow meter represented by expression (1), the target effective opening area CAt* to adequately achieve the target amount of intake air Qa* can be calculated even if the operating state of the engine 1 is changed resulting from a change of the environmental condition, the introduction of EGR (opening of the EGR valve 8), etc.

However, the calculation of the speed of sound $a_0$ in the atmosphere, which is required for the calculation of the target effective opening area CAt*, by using expression (4) in the ECU 9 becomes huge in the calculation load and hence not practicable.

Accordingly, in order to suppress or reduce the calculation load in the ECU 9, the sound speed calculation section 12 calculates the theoretical value of the speed of sound $a_0$ in the atmosphere in advance, stores it as map data with respect to the intake air temperature To, and calculates the speed of sound $a_0$ in the atmosphere by using the intake air temperature To before calculation processing in the target effective opening area calculation section 11.

Similarly, the calculation of the dimensionless flow rate σ required for the calculation of the target effective opening area CAt* in the ECU 9 by using expression (2) becomes huge in the calculation load and hence is not practicable.

Accordingly, in order to suppress or reduce the calculation load in the ECU 9, the dimensionless flow rate calculation section 14 calculates the theoretical value of the dimensionless flow rate σ in advance, stores it as map data with respect to the pressure ratio of the intake manifold pressure Pe and the atmospheric pressure Po, and calculates the dimensionless flow rate σ by using the pressure ratio Pe/Po of the intake manifold pressure Pe and the atmospheric pressure Po calculated by the pressure ratio calculation section 13 before calculation processing in the target effective opening area calculation section 11.

However, it is generally known that when the pressure ratio Pe/Po is equal to or less than a first predetermined value (about 0.528 in case of air), the flow rate of air passing through the throttle valve 4 is saturated in the following cases (so-called choking). In addition, it is also known that when such a choke occurs, the dimensionless flow rate σ calculated by expression (2) becomes a definite or fixed value.

Accordingly, the pressure ratio calculation section 13 includes a pressure ratio fixing section (not shown) which can deal with the occurrence of choking by fixedly setting the pressure ratio Pe/Po to the first predetermined value when the pressure ratio Pe/Po is equal to or less than the first predetermined value.

Here, note that instead of fixedly setting the pressure ratio Pe/Po to the first predetermined value in the pressure ratio calculation section 13, the map value of the dimensionless flow rate σ corresponding to the pressure ratio Pe/Po in the dimensionless flow rate calculation section 14 may be set to the same value as in the case of the first predetermined value, in a region in which the pressure ratio Pe/Po is equal to or less than the first predetermined value.

On the other hand, when the pressure ratio Pe/Po becomes equal to or larger than a certain value, the air flow sensor 2 and the intake manifold pressure sensor 7 are subjected to the influence of the pulsation of intake air, so there is a possibility that an error might occur in the measured value of the amount of intake air Qa with respect to the actual amount of intake air. Besides, there is also a possibility that the calculation of the dimensionless flow rate σ might be subjected to the great influence of a measurement error of the intake manifold pressure Pe due to the intake air pulsation.

Accordingly, when the pressure ratio Pe/Po is larger than the first predetermined value, the pressure ratio fixing section (not shown) in the pressure ratio calculation section 13 suppresses the influence of the intake air pulsation thereby to ensure the controllability of the throttle valve 4 by dealing with the pressure ratio Pe/Po as the first predetermined value.

Here, note that instead of fixedly setting the pressure ratio Pe/Po to the first predetermined value in the pressure ratio calculation section 13, the map value of the dimensionless flow rate σ corresponding to the pressure ratio Pe/Po in the dimensionless flow rate calculation section 14 may be set to the same value as in the case of the first predetermined value, in a region in which the pressure ratio Pe/Po is equal to or larger than the first predetermined value.

Hereinafter, the target opening calculation section 15 calculates the target opening TP* by using the target effective opening area CAt* calculated by the target effective opening area calculation section 11.

At this time, the target opening calculation section 15 obtains in advance the relation between the measured value of the throttle opening TP and the effective opening area CAt calculated from the measured value of the amount of intake air Qa according to expression (5), stores it as a two dimensional map in which the throttle opening TP and the effective opening area CAt correspond to each other one by one, and calculates the target opening TP* corresponding to the target effective opening area CAt* by using this two dimensional map.

As a result, the two dimension map of the throttle opening TP and the effective opening area CAt can be easily prepared, thus making it possible to reduce the man-hours for setting to a substantial extent.

Subsequently, upon controlling the throttle valve 4 so as to attain the target opening TP* calculated by the target opening calculation section 15, the throttle opening control section in the processing unit 9b calculates the throttle opening learning value so as to decrease an error between the target amount of intake air Qa* and the actual amount of intake air Qa resulting from the variations of the throttle body and the various kinds of sensors 30, various estimation errors, etc.

Now, specific reference will be made to calculation processing for a throttle opening learning value TPLRN according to the first embodiment of the present invention while referring to FIG. 4 and FIG. 5.

Figure 4:
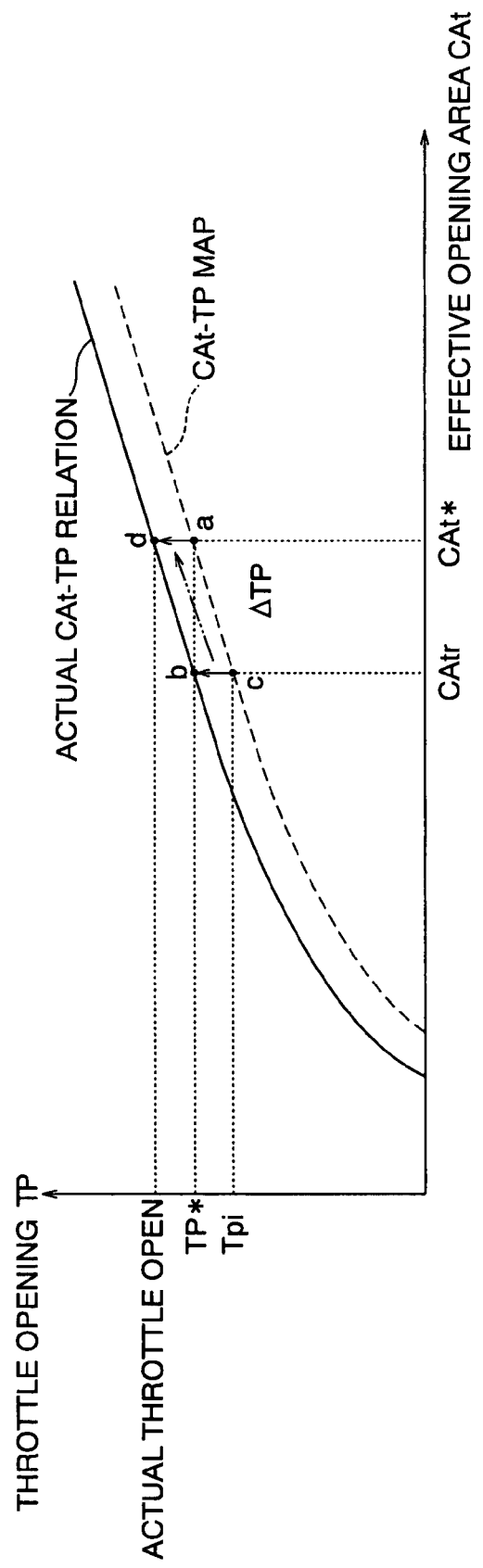
FIG. 4 is an explanatory view schematically illustrating the calculation processing of a throttle opening learning value according to the first embodiment of the present invention.
Figure 5:
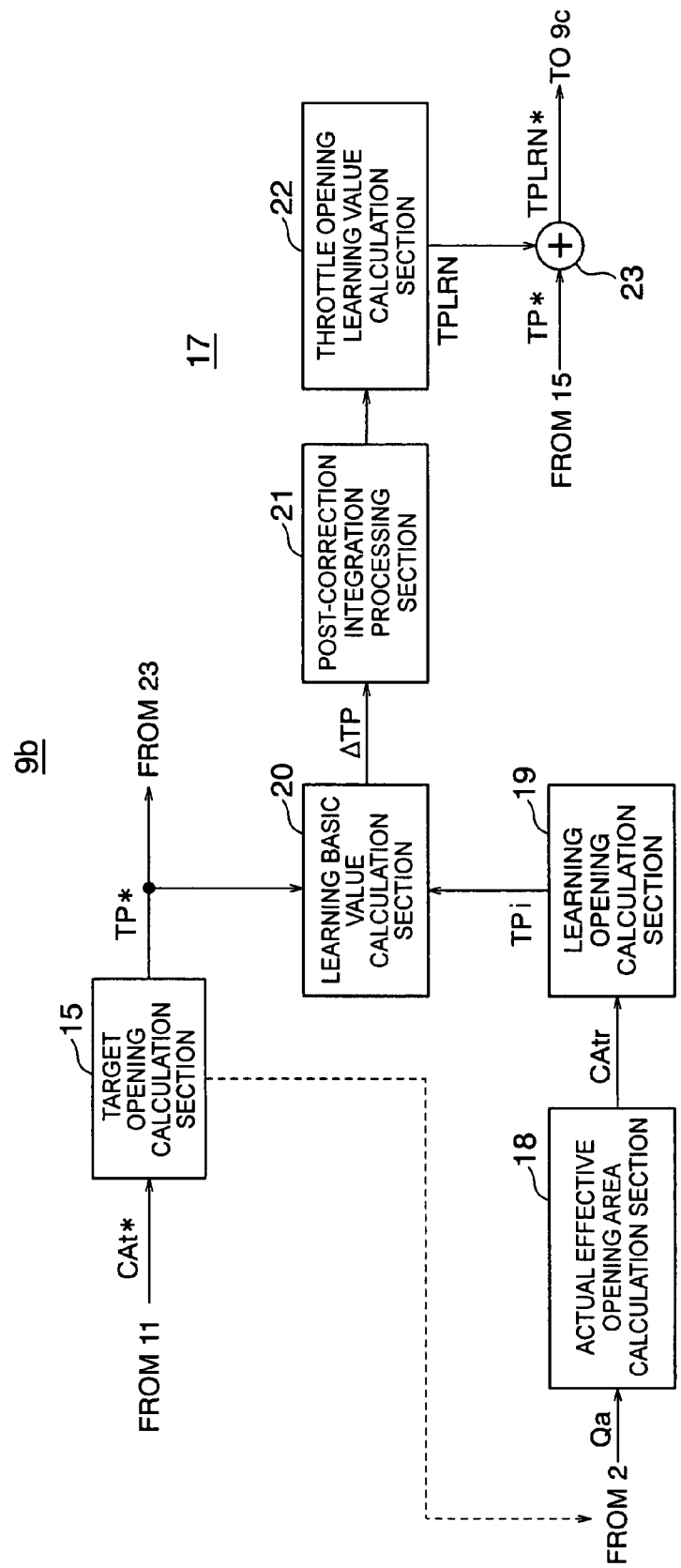
FIG. 5 is a functional block diagram schematically illustrating a throttle opening learning value calculation processing part of the throttle opening control section according to the first embodiment of the present invention.

FIG. 4 is an explanatory view that schematically illustrates the calculation processing for the throttle opening learning value TPLRN, and FIG. 5 is a functional block diagram that schematically illustrates a peripheral construction of a throttle opening learning value calculation processing section 22 in the throttle opening control section 17.

In FIG. 5, the throttle opening control section 17 in the processing unit 9b of the ECU 9 is provided with an actual effective opening area calculation section 18, a learning throttle opening calculation section (hereinafter referred to as a "learning opening calculation section") 19, the learning basic value calculation section 20 connected to the target opening calculation section 15, a post-correction integration processing section 21 that integrates a learning basic value ΔTP, the throttle opening learning value calculation section 22, and the learning corrected target throttle opening calculation section 23 (hereinafter referred to as a "learning corrected target opening calculation section").

Here, note that the configuration upstream of the target opening calculation section 15 is similar to that in the above-mentioned (see FIG. 3) and hence is omitted.

The actual effective opening area calculation section 18 calculates an actual effective opening area CAtr of the throttle valve 4 according to the throttle opening control section 17 based on the actual amount of intake air Qa when the throttle valve 4 is controlled to the target opening TP*.

At this time, the actual effective opening area calculation section 18 calculates the actual effective opening area CAtr of the throttle opening control section 17, as shown by the above-mentioned expression (5), by applying the amount of intake air Qa, the atmospheric pressure Po, the intake manifold pressure Pe, and the intake air temperature To the flow rate formula of a so-called throttle type flow meter, and inputs it to the learning throttle opening calculation section 19.

The learning throttle opening calculation section 19 calculates a learning throttle opening TPi (hereinafter referred to as a "learning opening") from the actual effective opening area CAtr by using a correspondence or correlation map between the throttle opening TP and the effective opening area CAt that are suited to each other in advance (hereinafter referred to as a "CAt-TP map"), and inputs it to the learning basic value calculation section 20.

The learning basic value calculation section 20 calculates a deviation ΔTP (=TP*−TPi) between the target opening TP* and the learning opening TPi as the learning basic value, and inputs it to the post-correction integration processing section 21.

The post-correction integration processing section 21 integrates the value obtained by multiplying the learning basic value ΔTP by a correction factor Kc (0≦Kc≦1) in a sequential manner (or by applying filtering processing to the learning basic value ΔTP), and inputs a value, which is obtained by removing an instantaneous variation from the learning basic value ΔTP, to the throttle opening learning value calculation section 22.

The throttle opening learning value calculation section 22 calculates the throttle opening learning value TPLRN based on the learning basic value ΔTP obtained through the post-integration processing section 21, and inputs it to the learning corrected target opening calculation section 23.

The learning corrected target opening calculation section 23 adds the throttle opening learning value TPLRN and the target opening TP* calculated by the target opening calculation section 15 to each other thereby to calculate a learning corrected target throttle opening (hereinafter referred to as a "learning corrected target opening") TPLRN*.

Thus, the throttle opening control section 17 calculates the throttle opening learning value TPLRN based on the learning basic value ΔTP (deviation between the target opening TP* and the learning opening TPi), and controls the throttle opening TP by using a learning corrected target opening TPLRN* that is obtained by correcting the target opening TP* by the throttle opening learning value TPLRN.

Hereinafter, specific reference will be made to the learning function of the throttle opening control section 17 while referring to FIG. 4 together with FIG. 3 and FIG. 5.

Here, assuming that the effective opening area CAt and the throttle opening TP correspond to each other one by one, when there exists an error between the target amount of intake air Qa* and the actual amount of intake air Qa, there will also be an error between the target effective opening area CAt* calculated from the target amount of intake air Qa* by the target effective opening area calculation section 11 and the actual effective opening area CAtr that is obtained by the actual effective opening area calculation section 18 by applying the amount of intake air Qa to expression (5).

For example, let us consider a case where as shown in FIG. 4, there exists an error between the CAt-TP map for control (see a broken line) and an actual relation between the effective opening area CAt and the throttle opening TP (hereinafter referred to as an "actual CAt-TP relation") (see a solid line) that are estimated while including the variation of the throttle body of the engine 1 to be currently controlled and the variations of the various kinds of sensors 30 that serve to measure the intake manifold pressure Pe, the atmospheric pressure Po, the intake air temperature To and so on.

First of all, the target effective opening area calculation section 11 calculates the target effective opening area CAt* from the target amount of intake air Qa*, as previously stated, and the target opening calculation section 15 calculates the target opening TP* from the presuited CAt-TP map (see a broken line in FIG. 4) by using the target effective opening area CAt*.

The relation between the target effective opening area CAt* and the target opening TP* calculated at this time is indicated at point a on the CAt-TP map in FIG. 4.

However, when an error exists between the CAt-TP map (broken line) and the actual CAt-TP relation (solid line), as shown in FIG. 4, the actual effective opening area CAtr at point b on the actual CAt-TP relation (solid line) corresponding to the target opening TP* is different from the target effective opening area CAt*, so the actual amount of intake air Qa that is obtained when the throttle opening TP is controlled to the target opening TP* will not coincide with the target amount of intake air Qa*.

Accordingly, in order to calculate a learning value for correction of this error, the actual effective opening area calculation section 18 first calculates the actual effective opening area CAtr based on the actual amount of intake air Qa measured at the time when the throttle valve 4 is controlled to the target opening TP*.

The relation between the actual effective opening area CAtr calculated by the actual effective opening area calculation section 18 and the target opening TP* is shown at point b on a curve of the actual CAt-TP relation (solid line) in FIG. 4.

In FIG. 4, to achieve the target effective opening area CAt* (the target amount of intake air Qa*), it is necessary to control the throttle opening TP to point d on the curve of the actual CAt-TP relation (solid line), it is necessary to calculate a difference between the point a and the point d as a learning value.

At this time, assuming that the CAt-TP map (broken line) and the actual CAt-TP relation (solid line) are locally substantially in a parallel relation with respect to each other, as shown in FIG. 4, the learning opening calculation section 19 calculates the learning opening TPi by using the CAt-TP map (broken line) based on the actual effective opening area CAtr calculated from the amount of intake air Qa obtained when the throttle valve 4 is controlled to the target opening TP*.

The relation between the learning opening TPi thus calculated and the actual effective opening area CAtr is indicated at point c on the CAt-TP map in FIG. 4.

Accordingly, the learning basic value calculation section 22 calculates the learning basic value ΔTP on the assumption that the throttle opening deviation ΔTP (=TP*−TPi) between the target opening TP* and the learning opening TPi indicated by a difference between point b and point c is substantially equal to the learning basic value between point a and point d.

The learning basic value ΔTP calculated by the learning basic value calculation section 22 includes an instantaneous variation, so the post-correction integration processing section 21 sequentially integrates the value obtained by multiplying the learning basic value ΔTP by the correction factor Kc (or by applying filtering processing), and then, the throttle opening learning value calculation section 22 calculates the throttle opening learning value TPLRN.

Finally, the learning corrected target opening calculation section 23 adds the throttle opening learning value TPLRN to the target opening TP* to calculate the learning corrected target opening TPLRN*.

Hereinafter, by controlling the throttle opening TP with the use of the learning corrected target opening TPLRN*, the throttle opening control section 17 decreases an error or difference between the target amount of intake air Qa* and the amount of intake air Qa.

Accordingly, it is possible to learn and correct the relation between the effective opening area CAt and the throttle opening TP in such a manner that upon calculation of the throttle opening TP for obtaining the target amount of intake air Qa*, the target amount of intake air Qa* can be adequately attained with respect to variations in the throttle body and various sensors or various kinds of estimation errors.

At this time, if an error or difference between the CAt-TP map (broken line) and the actual CAt-TP relation (solid line) is in a substantially constant or fixed (substantially parallel) relation, it is possible to adequately control the throttle valve 4 in the entire operating range of the engine 1 even when the throttle opening learning value TPLRN is used independently for feedback control.

Embodiment 2

Figure 6:
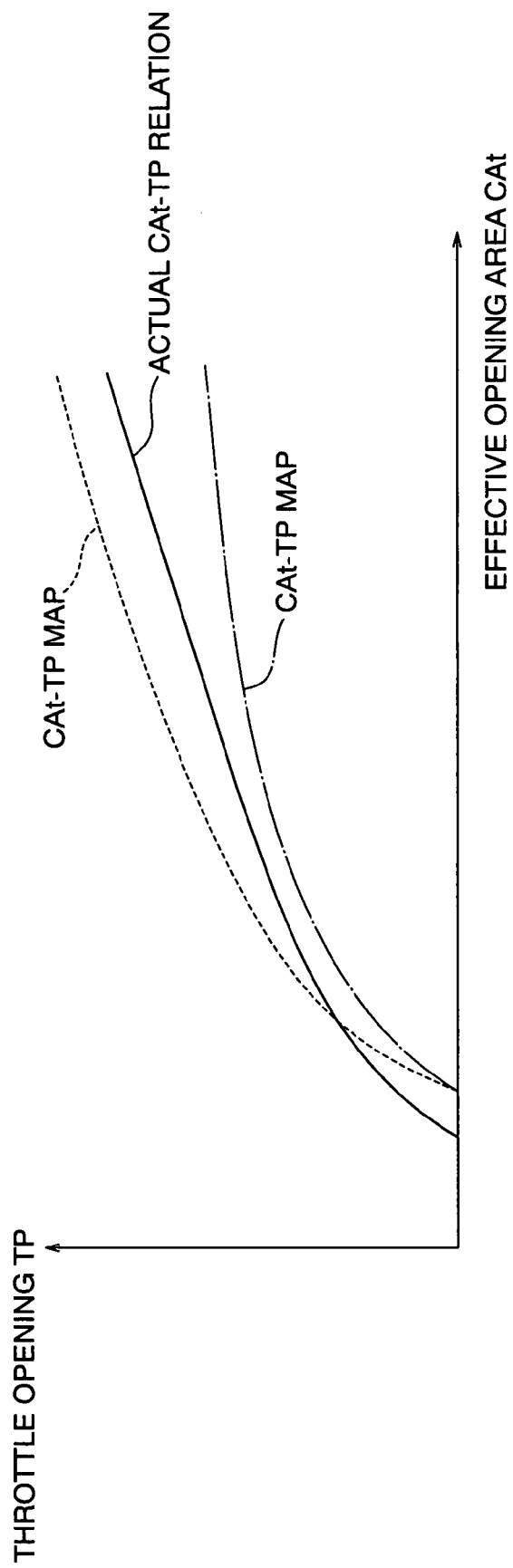
FIG. 6 is an explanatory view illustrating the relation of individual patterns between a CAt-TP map applied according to a second embodiment of the present invention and an actual CAt-TP.

Though not particularly referred to in the above-mentioned first embodiment, for example as shown in FIG. 6, in case where the CAt-TP map (see a broken line) crosses with respect to the actual CAt-TP relation (see a solid line), or an error of the CAt-TP map (see an alternate long and short dash line) with respect to the actual CAt-TP relation is not constant (parallel), there is a possibility that problems such as a follow-up delay, an overshoot, etc., might occur at the time of a transient operation if the throttle opening learning value TPLRN is used independently.

Figure 7:
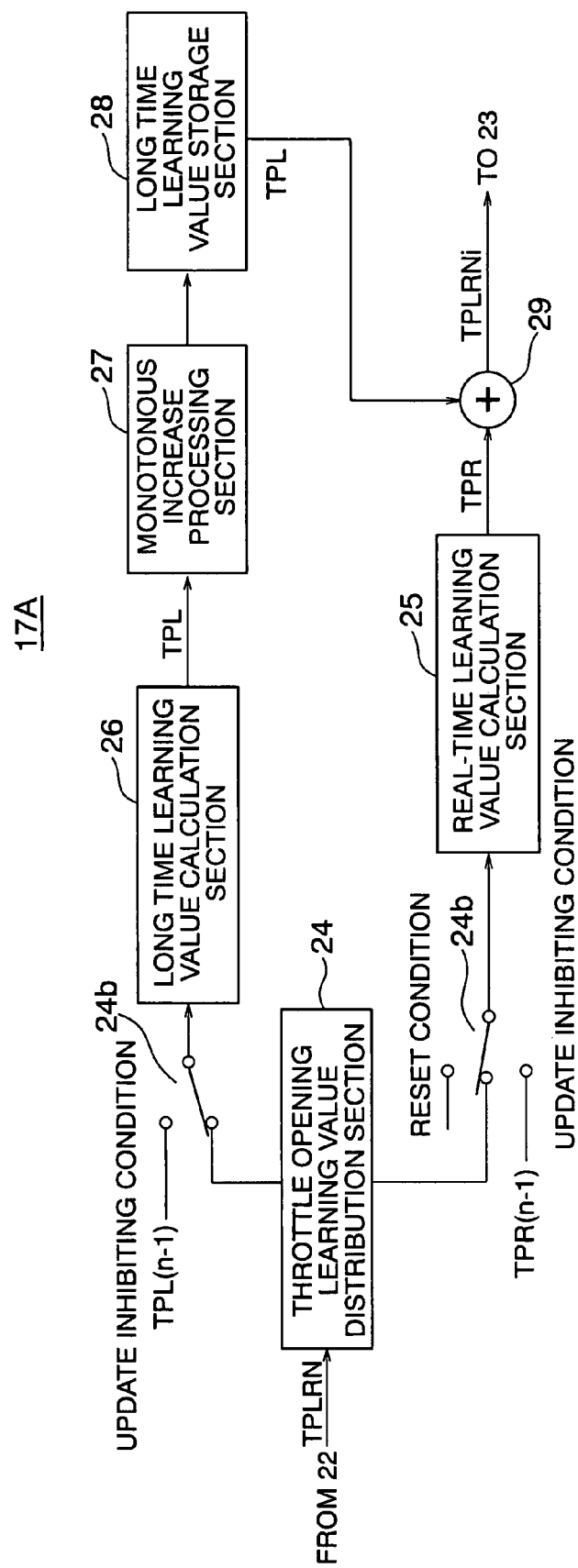
FIG. 7 is a functional block diagram schematically illustrating a storage processing section for a long time learning value according to the second embodiment of the present invention.

Accordingly, in order to deal with the case where the CAt-TP maps (see the broken line and the alternate long and short dash line) are not constant with respect to the actual CAt-TP relation (solid line) (see FIG. 6), it is desirable that as shown in FIG. 7, provision be made for a throttle opening learning value distribution section 24 that is arranged downstream of the throttle opening learning value calculation section 22 for distributing the throttle opening learning value TPLRN to a real-time learning value TPR to be used for feedback control and a long time learning value TPL to be stored in individual learning regions corresponding to portions of a CAt axis (the axis of abscissa in FIG. 4 and FIG. 6) of the CAt-TP map.

As a result, the sum of a value on the CAt-TP map and the long time learning value TPL can be brought close to the actual CAt-TP relation. In addition, an instantaneous error can be absorbed by the feedback control together with the use of the real-time learning value TPR.

Hereinafter, specific reference will be made to a second embodiment of the present invention while referring to explanatory views in FIG. 8 and FIG. 9 together with a functional block diagram in FIG. 7.

In FIG. 7, a throttle opening control section 17A according to the second embodiment of the present invention includes the throttle opening learning value distribution section 24 connected to the throttle opening learning value calculation section 22, a real-time learning value calculation section 25 connected to the throttle opening learning value distribution section 24 through a switching section 24a, a long time learning value calculation section 26 connected to the throttle opening learning value distribution section 24 through a switching section 24b, a monotonous increase processing section 27 connected to the long time learning value calculation section 26, a long time learning value storage section 28 connected to the monotonous increase processing section 27, and a correction throttle opening learning value calculation section 29 (hereinafter referred to as a "correction opening learning value calculation section") connected to the real-time learning value calculation section 25 and the long time learning value storage section 28.

Here, note that the configuration upstream of the throttle opening learning value calculation section 22 is similar to that in the above-mentioned (see FIG. 5) and hence is omitted.

In this case, the throttle opening learning value TPLRN is distributed to and stored in at least one of the real-time learning value TPR being updated in real time, and the long time learning value TPL corresponding to the individual learning regions according to the effective opening area axis (CAt axis) of the CAt-TP map.

Also, the long time learning value TPL is stored in at least one of a learning region corresponding to the target effective opening area CAt* and a learning region corresponding to the actual effective opening area CAtr.

First of all, the throttle opening learning value distribution section 24 distributes the throttle opening learning value TPLRN to the real-time learning value TPR and the long time learning value TPL at a predetermined ratio.

The switching section 24a inputs "0" to the real-time learning value calculation section 25 when a predetermined reset condition holds, and inputs the last real-time learning value TPR(n−1) to the real-time learning value calculation section 25 when a predetermined update inhibiting condition holds, whereas the switching section 24a inputs the current throttle opening learning value TPLRN to the real-time learning value calculation section 25 when the reset condition and the update inhibiting condition of the real-time learning value TPR do not hold.

Accordingly, when the reset condition and the update inhibiting condition (to be described later) of the real-time learning value TPR do not hold, the real-time learning value calculation section 25 calculates a final real-time learning value TPR based on the throttle opening learning value TPLRN.

The switching section 24b inputs the last long time learning value TPL(n−1) to the long time learning value calculation section 26 when the predetermined update inhibiting condition holds, and inputs the current throttle opening learning value TPLRN to the long time learning value calculation section 26 when the update inhibiting condition of the long time learning value TPL does not hold.

Accordingly, when the update inhibiting condition of the long time learning value TPL do not hold, the final long time learning value calculation section 26 calculates a final long time learning value TPL for each of the learning regions according to the portions of the CAt axis of the CAt-TP map based on the throttle opening learning value TPLRN.

Here, note that as a concrete example of the update inhibiting condition in the switching sections 24a, 24b, the updates of the real-time learning value TPR and the long time learning value TPL may be inhibited when the pressure ratio Pe/Po of the intake manifold pressure Pe (the intake pipe internal pressure) to the atmospheric pressure Po indicates a value equal to or larger than a first predetermined value.

In addition, as a concrete example of the reset condition in the switching section 24a, the real-time learning value TPR may be reset in a period in which the time elapsed after the time change rate dQa*/dt of the target amount of intake air Qa* has reached a second predetermined value or more indicates a value less than or equal to a third predetermined value. This condition is at the same time used as the update inhibiting condition of the long time learning value TPL, too.

The monotonous increase processing section 27 limits the long time learning value TPL in such a manner that the CAt-TP map and the actual CAt-TP relation (the relation between the effective opening area CAt and the throttle opening TP of the throttle opening control section 17A) after corrected by addition thereto of the long time learning value TPL become monotonously increasing.

The long time learning value storage section 28 stores the long time learning value TPL through the monotonous increase processing section 27.

The correction opening learning value calculation section 29 is in the form of an adding section that serves to add the real-time learning value TPR and the long time learning value TPL to each other, and inputs the result of the addition to the learning corrected target opening calculation section 23 as a correction throttle opening learning value TPLRNi (hereinafter referred to as a "correction opening learning value").

The long time learning value storage section 28 in the throttle opening control section 17A functions as a backup memory. That is, when the engine 1 is stopped or when the power supply for the control apparatus for an internal combustion engine is turned off, the real-time learning value TPR is reset, and the long time learning value TPL is held in the long time learning value storage section 28 (backup memory).

In addition, the update of the real-time learning value TPR is inhibited in a period of time in which the time elapsed after the starting of the engine 1 indicates a value within a fourth predetermined value, and the update of the long time learning value TPL is inhibited in a period of time in which the time elapsed after the starting of the engine 1 indicates a value that is equal to or larger than the fourth predetermined value and within a fifth predetermined value.

Further, when the number of revolutions per minute of the engine 1 indicates a value less than or equal to a sixth predetermined value that is lower than a target number of revolutions per minute of the engine 1 during idling, the update of the long time learning value TPL is inhibited.

Next, specific reference will be made to the calculation processing of the long time learning value TPL in each learning region according to the second embodiment of the present invention, as illustrated in FIG. 7, while referring to FIGS. 8 and 9 together with FIG. 4.

Figure 8:
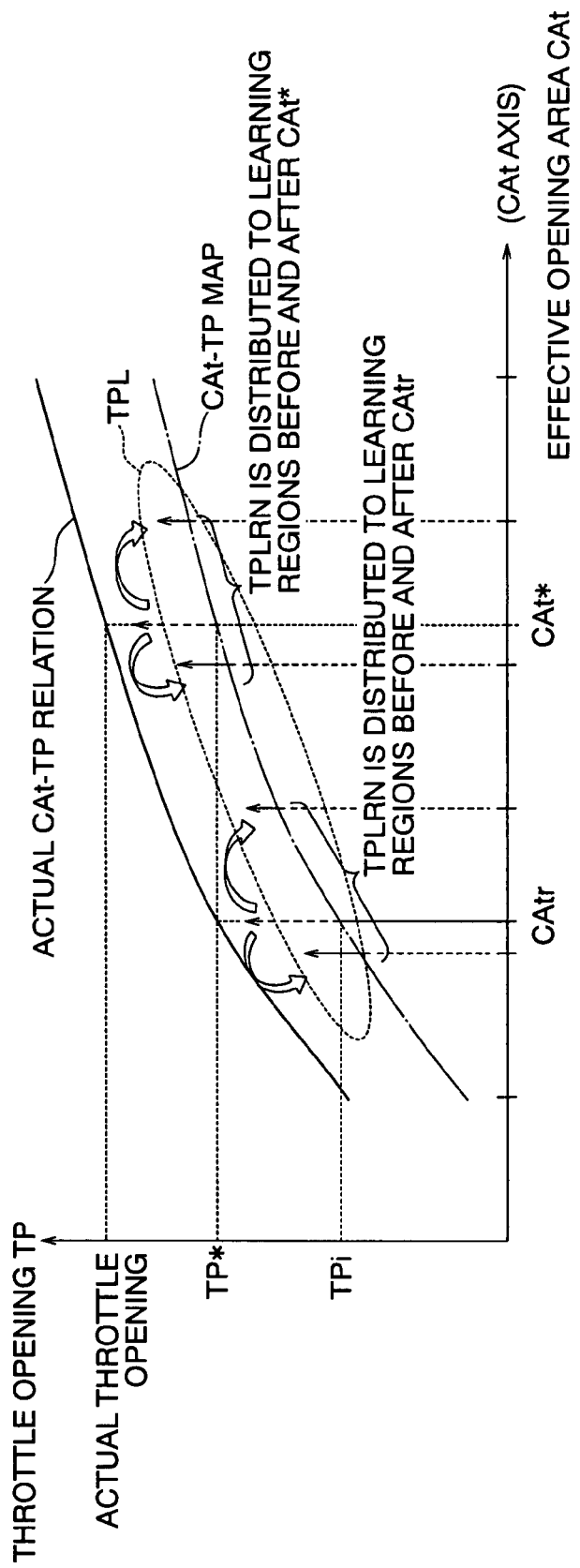
FIG. 8 is an explanatory view schematically illustrating storage processing for the long time learning value according to the second embodiment of the present invention.
Figure 9:
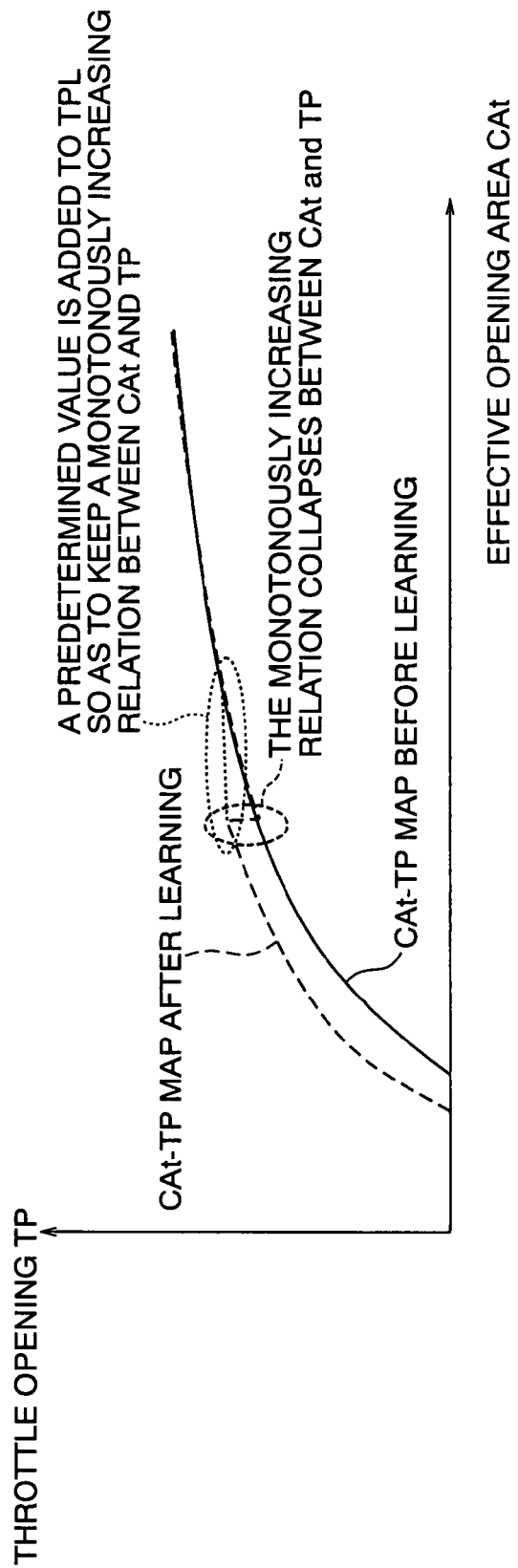
FIG. 9 is an explanatory view schematically illustrating monotonously increasing processing for the long time learning value according to the second embodiment of the present invention.

FIGS. 8 and 9 are explanatory views that schematically illustrate storage processing and monotonously increasing processing, respectively, for the long time learning value according to the second embodiment of the present invention.

In FIG. 4, as previously stated, the throttle opening learning value TPLRN calculates a difference ΔTP between point b and point c (a throttle opening deviation between the target opening TP and the learning opening TPi) as a learning basic value, and applies the learning basic value ΔTP as a learning value between point a and point d.

Here, let us consider the case where the throttle opening learning value TPLRN is distributed to and stored in learning regions corresponding to a one to one distribution for example with respect to the CAt axis of the CAt-TP map.

At this time, as shown in FIG. 8, the long time learning value TPL can be stored in at least one of a learning region corresponding to the CAt axis before and after the target effective opening area CAt* and a learning region corresponding to the CAt axis before and after the actual effective opening area CAtr.

Here, note that the long time learning value TPL stored in a learning region corresponding to each CAt axis is calculated by adding a predetermined value to the last long time learning value TPL(n−1), or by adding a value corresponding to a ratio of distances between the CAt axes before and after the target effective opening area CAt* and the actual effective opening area CAtr to the last long time learning value TPL(n−1).

In addition, if the long time learning value TPL is stored with both the target effective opening area CAt* and the actual effective opening area CAtr, the convergence time of the long time learning value TPL can be shortened.

In case where the long time learning value TPL is calculated in this manner, the learnable condition is only the case where the update inhibiting condition does not hold (to be described later), so the case of actual learning being carried out is limited only to a region in which steady-state operation is regularly used.

In general, the throttle opening TP and the amount of intake air Qa are in a monotonously increasing relation, so the effective opening area CAt and the throttle opening TP should be in a monotonously increasing relation.

However, when learning is locally carried out, as shown by a broken line and a broken line frame in FIG. 9, the sum of the value of the CAt-TP map (see a solid line) and the long time learning value TPL (see a broken line) might not become monotonously increasing.

In this case, the learning corrected target opening TPLRN* decreases in spite of the increasing target amount of intake air Qa* for example, so there arise problems such as reduction in the output power of the engine 1, the mislearning of the throttle opening learning value TPLRN, etc.

Accordingly, the monotonous increase processing section 27 performs the processing of adding a predetermined value to the long time learning value TPL thereby to limit the long time learning value TPL in such a manner that the sum of the value of the CAt-TP map (solid line) and the long time learning value TPL (see a dotted line) becomes monotonously increasing, as shown by a dotted line and a dotted line frame in FIG. 9. As a result, the mislearning and malfunction of the throttle opening learning value TPLRN can be prevented.

Hereinafter, specific reference will be made to the monotonously increasing processing according to the monotonous increase processing section 27.

First of all, by using a CAt axis number n, the long time learning value currently being learned is set as TPL(n), and the range that can be taken by the CAt axis number n currently being learned is set to "$1 \leq n \leq CAt$ axis number".

Here, the long time learning value TPL after the monotonously increasing correction can be calculated by repeating the calculation of the following expression (6) for a long time learning value TPL (m+1+i) that is in a region in which the CAt axis number n thereof is larger than a predetermined value m.

$TPL(m+1+i)$ $= \max\{CAt$ map value$(m+i)+TPL(m+i)+$predetermined value, $CAt$ map value$(m+1+i)+TPL(m+1+i)\}-CAt$ map value$(m+1+i)$ (6)

where variable i sequentially increases from "0" up to "CAt axis number$-(m+1)$" at the time of repeating the calculation.

On the other hand, a long time learning value TPL (m−1−i), which is in a region where the CAt axis number n thereof is less than the predetermined value m, can be calculated by repeating the calculation of the following expression (7).

$TPL(m-1-j)$ $= \min\{CAt$ map value$(m-j)+TPL(m-j)-$predetermined value, $CAt$ map value$(n-1-j)+TPL(m-1-j)\}-CAt$ map value$(m-1-j)$ (7)

where a variable j sequentially increases from "0" up to "m−2" at the time of repeating the calculation.

After execution of the calculations of the above-mentioned expressions (6), (7), the long time learning value storage section 28 stores a final long time learning value TPL in each learning region.

As shown in FIG. 7, in case where the throttle opening learning value TPLRN is distributed to the real-time learning value TPR and the long time learning value TPL which is then stored, the correction opening learning value calculation section 29 adds the real-time learning value TPR and the long time learning value TPL corresponding to an engine operating range to each other thereby to calculate a correction opening learning value TPLRNi, and inputs it to the learning corrected target opening calculation section 23.

Accordingly, the learning corrected target opening calculation section 23 calculates the learning corrected target opening TPLRN* (=TPLRNi+TP*) by using the correction opening learning value TPLRNi in place of the throttle opening learning value TPLRN.

As described above, the calculation of the throttle opening learning value TPLRN is performed, and at the same time, the calculation and storing of the long time learning value TPL based on the throttle opening learning value TPLRN are also carried out, but such learning processing can not be performed in all the operating ranges, so learning inhibiting processing is needed.

Hereinafter, specific reference will be made to a learning inhibiting condition according to the second embodiment of the present invention.

As stated above, the air flow sensor 2 is subjected to the pulsation of intake air when the pressure ratio Pe/Po of the intake manifold pressure Pe to the atmospheric pressure Po increases to a certain extent. As a result, an error might occur between an actual amount of intake air and a measured amount of intake air, so in such an operating range, the throttle opening learning value TPLRN can not be calculated accurately.

Accordingly, when the pressure ratio Pe/Po indicate a value equal to or larger than the above-mentioned first predetermined value, the switching sections 24a, 24b select the last real-time learning value TPR(n−1) and the last long time learning value TPL(n−1), respectively, and inhibit the updates of the real-time learning value TPR and the long time learning value TPL. As a result, the mislearning of the throttle opening TP due to the influence of the intake air pulsation can be prevented.

In addition, when the target amount of intake air Qa* is suddenly changed during the transient operation or the like, a certain time will be needed until the time when the amount of intake air Qa responds to the change of the target amount of intake air Qa*, due to the calculation time delay until the completion of calculation of the target opening TP*, the response delay until the throttle opening TP arrives at the target opening TP*, the response delay until the flow speed near the air flow sensor 2 is changed due to the change of the throttle opening, the response delay of the air flow sensor 2 itself, and so on.

Accordingly, when the time elapsed after the rate of change of the target amount of intake air Qa* became the second predetermined value or above indicates a value within the third predetermined value, the switching section 24b inhibits the update of the long time learning value TPL. As a result, the mislearning of the long time learning value TPL due to a response delay in the amount of intake air Qa can be prevented.

Here, note that in the condition at this time, if the update of the real-time learning value TPR is also inhibited by the switching section 24a, when it is considered that the value of the CAt-TP map (broken line) in FIG. 6 changes across a crossing point thereof with the actual CAt-TP relation (solid line) for example, the sign of the real-time learning value TPR is reversed before and after the crossing point, so there arise problems such as the occurrence of overshooting, an increased time of convergence to the target amount of intake air Qa*, etc.

Accordingly, when the time elapsed after the rate of change of the target amount of intake air Qa* became the second predetermined value or above indicates a value within the third predetermined value, the switching section 24a performs reset processing on the real-time learning value TPR (TPR=0). Thus, overshooting can be suppressed, whereby it is possible to prevent an increase in the convergence time to the target amount of intake air Qa*.

Further, when the engine 1 is stopped or the power supply of the ECU 9 is turned off, the learning processing of the throttle opening TP can not be executed, so the switching section 24a performs the reset processing of the real-time learning value TPR.

On the other hand, by holding the long time learning value TPL in the long time learning value storage section 28 (backup memory), it is possible to adequately control the throttle valve 4 so as to achieve the target amount of intake air Qa* even at the next restart of the engine 1.

Here, note that at the start of the engine 1, the air near the air flow sensor 2 does not generally move during the time the engine 1 is consuming the air in the surge tank 6, so a certain period of time is required until the air near the air flow sensor 2 begins to flow after the start of the engine 1 so as to enable the amount of intake air Qa to be measured in an accurate manner.

In view of this, when the time elapsed after the starting of the engine 1 indicates a value within the fourth predetermined value, the storage section 24 inhibits the update of the real-time learning value TPR, whereby an error in the calculation of the real-time learning value TPR due to the influence of the amount of intake air Qa can be prevented.

In addition, until the time the number of revolutions per minute of the engine 1 is converged into the one at the time of idling after the starting of the engine 1, variations in the number of revolutions per minute of the engine 1 and in the amount of intake air Qa are intense, so it is undesirable to store the throttle opening learning value TPLRN as the long time learning value TPL.

Accordingly, when the time elapsed after the starting of the engine 1 indicates a value within the fifth predetermined value ($\geq$ fourth predetermined value), the switching section 24b inhibits the update of the long time learning value TPL, whereby the mislearning of the long time learning value TPL can be prevented.

In this case, when the time elapsed after the starting of the engine 1 is between the fourth predetermined value and the fifth predetermined value, the real-time learning value TPR is updated, but the real-time learning value TPR acts as feedback control. Thus, by updating the learning value, the throttle opening TP is controlled so as to achieve the target amount of intake air Qa*, whereby an engine stall due to the reduction in the number of engine revolutions per minute, which might otherwise be caused after the starting of the engine 1, can be prevented.

Moreover, in cases where the number of revolutions per minute of the engine 1 falls greatly below that during idling immediately before the engine 1 is stopped or in accordance with load variation, etc., variations in the number of engine revolutions per minute and in the amount of intake air Qa are intense, too, so it is undesirable to store the throttle opening learning value TPLRN as the long time learning value TPL.

Accordingly, when the number of revolutions per minute of the engine 1 falls below the sixth predetermined value which is smaller than the number of revolutions per minute of the engine 1 during idling, the switching section 24b also inhibits the update of the long time learning value TPL.

On the other hand, the real-time learning value TPL acts as feedback control, so the engine stall can be prevented by updating the learning value thereby to control the throttle opening so as to achieve the target amount of intake air Qa*.

While the invention has been described in terms of preferred embodiments, those skilled in the art will recognize that the invention can be practiced with modifications within the spirit and scope of the appended claims.

What is claimed is:

1. A control apparatus for an internal combustion engine comprising:
a throttle valve that is arranged in an intake passage of said internal combustion engine;
a throttle opening control section that variably controls an amount of intake air supplied to said internal combustion engine by changing an effective opening area of said intake passage thereby to control a throttle opening of said throttle valve;
an operating state detection section that detects an operating state of said internal combustion engine, and includes an intake air amount detection section that detects the amount of intake air supplied to said internal combustion engine, an atmospheric pressure detection section that detects pressure at an atmospheric side of said throttle valve as an atmospheric pressure, an intake pipe internal pressure detection section that detects pressure at said internal combustion engine side of said throttle valve as an intake pipe internal pressure, and an intake air temperature detection section that detects an intake air temperature at an atmospheric side of said throttle valve;
a target intake air amount calculation section that calculates a target amount of intake air based on the operating state of said internal combustion engine;
a target effective opening area calculation section that calculates a target effective opening area of said throttle opening control section by applying said target amount of intake air, said atmospheric pressure, said intake pipe internal pressure and said intake air temperature to a flow rate formula for a throttle type flow meter;
a target throttle opening calculation section that calculates a target throttle opening from said target effective opening area by using a correlation map between the effective opening area and the throttle opening, which are suited to each other in advance, of said throttle opening control section;
an actual effective opening area calculation section that calculates an actual effective opening area of said throttle opening control section by applying said amount of intake air, said atmospheric pressure, said intake pipe internal pressure and said intake air temperature to said flow rate formula for a throttle type flow meter; and
a learning throttle opening calculation section that calculates a learning throttle opening from said actual effective opening area by using said correlation map;
wherein said throttle opening control section includes a throttle opening learning value calculation section that calculates a throttle opening learning value based on a deviation between said target throttle opening and said learning throttle opening; and
said throttle opening control section controls said throttle opening based on a learning corrected target throttle opening which is obtained by correcting said target throttle opening by said throttle opening learning value.

2. The control apparatus for an internal combustion engine as set forth in claim 1, wherein
said throttle opening learning value is distributed to and stored in at least one of a real-time learning value being updated in real time and a long time learning value corresponding to each learning region according to an effective opening area axis of said correlation map.

3. The control apparatus for an internal combustion engine as set forth in claim 1, wherein
said long time learning value is stored in at least one of a first learning region corresponding to said target effective opening area and a second learning region corresponding to said actual effective opening area.

4. The control apparatus for an internal combustion engine as set forth in claim 1, wherein
said long time learning value is limited in such a manner that said correlation map and a relation between an effective opening area of said throttle opening control section to which said long time learning value is added and said throttle opening become monotonously increasing.

5. The control apparatus for an internal combustion engine as set forth in claim 1, wherein
the updates of said real-time learning value and said long time learning value is inhibited when a pressure ratio of said intake pipe internal pressure to said atmospheric pressure indicates a value equal to or larger than a first predetermined value.

6. The control apparatus for an internal combustion engine as set forth in claim 1, wherein
in a period in which the time elapsed after a time change rate of said target amount of intake air has reached a second predetermined value or more indicates a value less than or equal to a third predetermined value, said real-time learning value is reset, and the update of said long time learning value is inhibited.

7. The control apparatus for an internal combustion engine as set forth in claim 1, wherein
said throttle opening control section includes a backup memory;

when said engine is stopped or when a power supply for said control apparatus is turned off, said real-time learning value is reset, and said long time learning value is held in said backup memory;

in a period of time in which the time elapsed after the starting of said engine indicates a value within a fourth predetermined value, the update of said real-time learning value is inhibited;

in a period of time in which the time elapsed after the starting of said engine indicates a value that is equal to or larger than said fourth predetermined value and within a fifth predetermined value, the update of said long time learning value is inhibited; and when the number of revolutions per minute of said internal combustion engine indicates a value less than or equal to a sixth predetermined value that is lower than a target number of revolutions per minute of said engine during idling, the update of said long time learning value is inhibited.

* * * * *